(12) United States Patent
Newstadt et al.

(10) Patent No.: US 9,104,519 B1  
(45) Date of Patent: Aug. 11, 2015

(54) PROVISIONING PARTNER AWARE APPS ON SANDBOXED OPERATING SYSTEMS

(71) Applicant: Symantec Corporation, Mountain View, CA (US)

(72) Inventors: Keith Newstadt, West Newton, MA (US); Petrus Johannes Viljoen, Redondo Beach, CA (US); Anubhav Savant, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 173 days.

(21) Appl. No.: 13/920,006

(22) Filed: Jun. 17, 2013

(51) Int. Cl.  
*G06F 9/44* (2006.01)  
*G06F 9/45* (2006.01)  
*G06F 9/445* (2006.01)  
*G06F 17/30* (2006.01)

(52) U.S. Cl.  
CPC .. *G06F 8/65* (2013.01); *G06F 8/60* (2013.01); *G06F 8/20* (2013.01); *G06F 17/30876* (2013.01)

(58) Field of Classification Search  
CPC .......... G06F 17/3089; G06F 17/30873; G06F 17/30876; G06F 8/40; G06F 8/65; G06F 8/60; G06F 8/20  
See application file for complete search history.

(56) References Cited

U.S. PATENT DOCUMENTS

| | | | |
|---|---|---|---|
| 8,239,848 B2 * | 8/2012 | Ghercioiu et al. | 717/162 |
| 2005/0172279 A1 * | 8/2005 | Cook et al. | 717/162 |
| 2006/0005182 A1 * | 1/2006 | Butterweck et al. | 717/175 |
| 2007/0157190 A1 * | 7/2007 | Shiu | 717/162 |
| 2008/0201705 A1 * | 8/2008 | Wookey | 717/175 |
| 2010/0281475 A1 * | 11/2010 | Jain et al. | 717/172 |
| 2010/0318985 A1 * | 12/2010 | Moffatt et al. | 717/175 |
| 2011/0067105 A1 * | 3/2011 | Wolfe et al. | 726/23 |
| 2011/0209138 A1 * | 8/2011 | Monteith et al. | 717/172 |
| 2011/0258595 A1 * | 10/2011 | Clevenger | 717/106 |
| 2011/0307794 A1 * | 12/2011 | Hilerio et al. | 715/738 |
| 2011/0307880 A1 * | 12/2011 | Hilerio et al. | 717/171 |
| 2011/0321139 A1 * | 12/2011 | Jayaraman et al. | 726/4 |
| 2012/0144492 A1 * | 6/2012 | Griffin et al. | 726/25 |
| 2012/0159430 A1 * | 6/2012 | Waldbaum et al. | 717/106 |
| 2013/0036413 A1 * | 2/2013 | Venkatesan et al. | 717/172 |
| 2013/0111460 A1 * | 5/2013 | Mohamed et al. | 717/172 |
| 2013/0263083 A1 * | 10/2013 | Reddy et al. | 717/106 |
| 2013/0268357 A1 * | 10/2013 | Heath | 705/14.53 |

(Continued)

OTHER PUBLICATIONS

Chad Carter, Creating a Windows 8 App: Try Out File / New / Project, 2012, pp. 1-5.*

(Continued)

*Primary Examiner* — Thuy Dao  
*Assistant Examiner* — Mongbao Nguyen  
(74) *Attorney, Agent, or Firm* — Brill Law Office; Jeffrey Brill

(57) ABSTRACT

A mobile app is provisioned with an identifier of a specific partner of an app provider, on a sandboxed OS on a mobile device. A link to the app provider's website containing the partner ID is received from the partner's website. The user navigates to the provider's website, which writes a cookie containing the partner ID and redirects to an app store. The app is downloaded to the mobile device, and registers itself with the OS as a protocol handler for a provider specific protocol. The app launches the provider's website, which retrieves the partner ID from the cookie, and returns a redirect to the provider specific protocol. The redirect contains the partner ID, and causes the app to execute as the registered protocol handler for the provider specific protocol. The app reads the partner ID from the redirect, and uses it to provide partner specific features.

17 Claims, 4 Drawing Sheets

(56) References Cited

U.S. PATENT DOCUMENTS

| | | | |
|---|---|---|---|
| 2014/0040871 A1* | 2/2014 | Schwan et al. | 717/141 |
| 2014/0089933 A1* | 3/2014 | Lioy et al. | 718/104 |
| 2014/0157228 A1* | 6/2014 | Pasternak | 717/106 |
| 2014/0244457 A1* | 8/2014 | Howell et al. | 705/31 |

OTHER PUBLICATIONS

Achim Weimert, A Secure Architecture for Untrusted Web Browser Plugins, 2011, pp. 1-14.*

Norik Davtian, How to build your first web application—Tutorial Series, 2012, pp. 1-19.*

Michael Mahemoff, HTML5 vs Native: The Mobile App Debate, 2011, pp. 1-7.*

Suhas Holla, Android Based Mobile Application Development and its Security, 2012, pp. 486-489.*

James L Lentz, User interface design for the mobile web, Best practices for designing applications for multiple device platforms, 2011, pp. 1-12.*

* cited by examiner

PROVISIONING PARTNER AWARE APPS ON SANDBOXED OPERATING SYSTEMS

TECHNICAL FIELD

This disclosure pertains generally to apps for mobile computing devices, and more specifically to provisioning a generic build of a mobile app with an identifier (ID) of a specific partner on a sandboxed operating system.

BACKGROUND

Mobile computing devices such as smartphones and tablet computers are becoming more widely used every day. There are multiple mobile operating systems available for different mobile computing devices, each with a wide variety of available apps. Users can install apps on their mobile devices by downloading them from an online app store that provides apps for their particular mobile operating system.

Apple's iOS (formerly known as iPhone OS) is a mobile operating system that runs on Apple mobile devices such as the iPhone, the iPad and the iPod Touch. Many applications ("apps") for iOS are available for download from Apple's App Store. Android is an open-source, Linux based operating system for mobile devices. A large community of developers write apps that run on Android devices. Many of these apps are available online through Google Play (formerly the Android Market). Android apps can also be downloaded from other online stores and additional third-party sites. Windows Phone is a mobile operating system developed by Microsoft. Users can download apps for Windows Phone from Microsoft's Windows Phone Marketplace. Another example of a mobile operating system is Blackberry OS (the latest version is Blackberry 10) from BlackBerry Limited (formerly Research In Motion). Blackberry OS apps are downloaded from the BlackBerry World Storefront.

Many mobile operating systems such as iOS, Android and Windows Phone run each app in a separate sandbox, which is an isolated area that does not have access to the rest of the system's resources, unless permissions are explicitly granted. A sandbox is a tightly controlled environment, providing limited areas of storage and memory for the app, and restricting or disallowing access to system and hardware resources such as network, input devices, current location, contacts, etc. Typically, a sandboxed app is only allowed to access files inside its own storage area, and cannot change system settings. Operating systems that run apps in this manner are sometimes referred to as sandboxed operating systems.

Providers of apps, such as commercial software publishers, often create partnerships with separate organizations, such as internet service providers (ISPs) or retailers. Under these partnerships, it is desirable to provide partner specific branding, authentication and other targeted features as part of the app. In this context, a given software publisher may enter into separate arrangements with multiple parties to provide partner specific versions of the same underlying app. For example, a publisher of a mobile security app may have a partnership with an ISP, a separate partnership with a retailer of tablets and a third partnership with a cell phone carrier. In this case, it would be desirable for the app provider to distribute a separate, partner-aware version of the security app to each partner's customers (e.g., the ISP subscribers, the tablet purchasers and the cellular service customers). In other words, each partner wants a version of the app to be provided to its customers that includes its own specific branding and other targeted features.

Where an app is developed to be run on a sandboxed operating system and to be distributed via an app store, certain inherent difficulties arise in building separate partner aware instantiations of the app for multiple partners. It is desirable for different users to be able to download different, partner branded versions of the same app, based on the specific partner with which each specific user has the business relationship. For example, a first user may be getting the app in conjunction with their ISP, whereas a second user may be getting the app in conjunction with their cellular carrier. Thus, although the two users are installing the same core app, the partner specific branding and authentication should be different for each user. Yet, because of the sandboxed nature of mobile operating systems, once installed the app cannot conventionally access configuration information on the mobile device that could indicate the specific partner associated with the user.

The software publisher can build a different version of the app for each partner, and make each separate version available for download from the app store. Problematically, this approach creates a great deal of overhead, both in terms of developing and maintaining multiple versions of the app, and in managing the app store deployment of the multiple versions. This approach also results in a poor user experience, because a search of an app store for a given app results in multiple versions of the same app, each branded for a different partner, and perhaps an additional, unbranded version. These multiple search results tend to confuse the user, who does not typically understand the differences between the versions, or know which one to download.

It would be desirable to address these issues.

SUMMARY

A generic build of a mobile app is provisioned with an identifier of a specific partner (a "partner ID") of the app provider, on a sandboxed mobile operating system on a mobile computing device. A sandboxed mobile operating system such as iOS, Windows Phone, Android or Blackberry OS runs on a mobile computing device, such as a smartphone or tablet. A mobile browser on the mobile computing device navigates to a website of the specific partner of the app provider. A link to a section of the app provider's website concerning the mobile app is the received from the website of the specific partner, by the mobile browser. The link further contains an identifier of the specific partner. For example, the link can be in the form of an underlying address (e.g., a URL), further comprising the specific partner ID as a parameter. The mobile browser navigates to the section of the provider's website concerning the mobile app, and provides the partner ID. The provider's website returns a cookie containing the partner ID and a redirect (e.g., an HTTP 302) to a section of an app store concerning the mobile app. The mobile browser stores the cookie containing the specific partner ID on the mobile computing device, and navigates to the target section of the app store, responsive to the redirect.

The generic build of the mobile app is downloaded from the app store to the mobile computing device. The generic build of the app is not associated with any specific partner and does not have any partner branding or affiliation at this point. The mobile app registers itself with the sandboxed mobile operating system as a protocol handler for a provider specific protocol. For example, the mobile app can use the protocol handler registration functionality of the sandboxed mobile operating system to set up a call back to itself from the provider's web site. The mobile app launches the provider's website, which retrieves the partner ID from the cookie on the mobile device, and returns a redirect to the provider specific protocol. The redirect contains the specific partner ID, and causes the mobile app to execute as the registered protocol handler for the provider specific protocol. The mobile app reads the partner ID from the redirect, and uses it to provide partner specific features on the sandboxed mobile operating system on the mobile computing device. For example, the mobile app can use the partner ID to provide partner specific branding and/or partner specific authentication. In other embodiments, similar functionality is utilized to provision a generic build of a mobile app with data other than a partner ID, such as, for example, an authorization token, a server location, a user account ID, etc.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
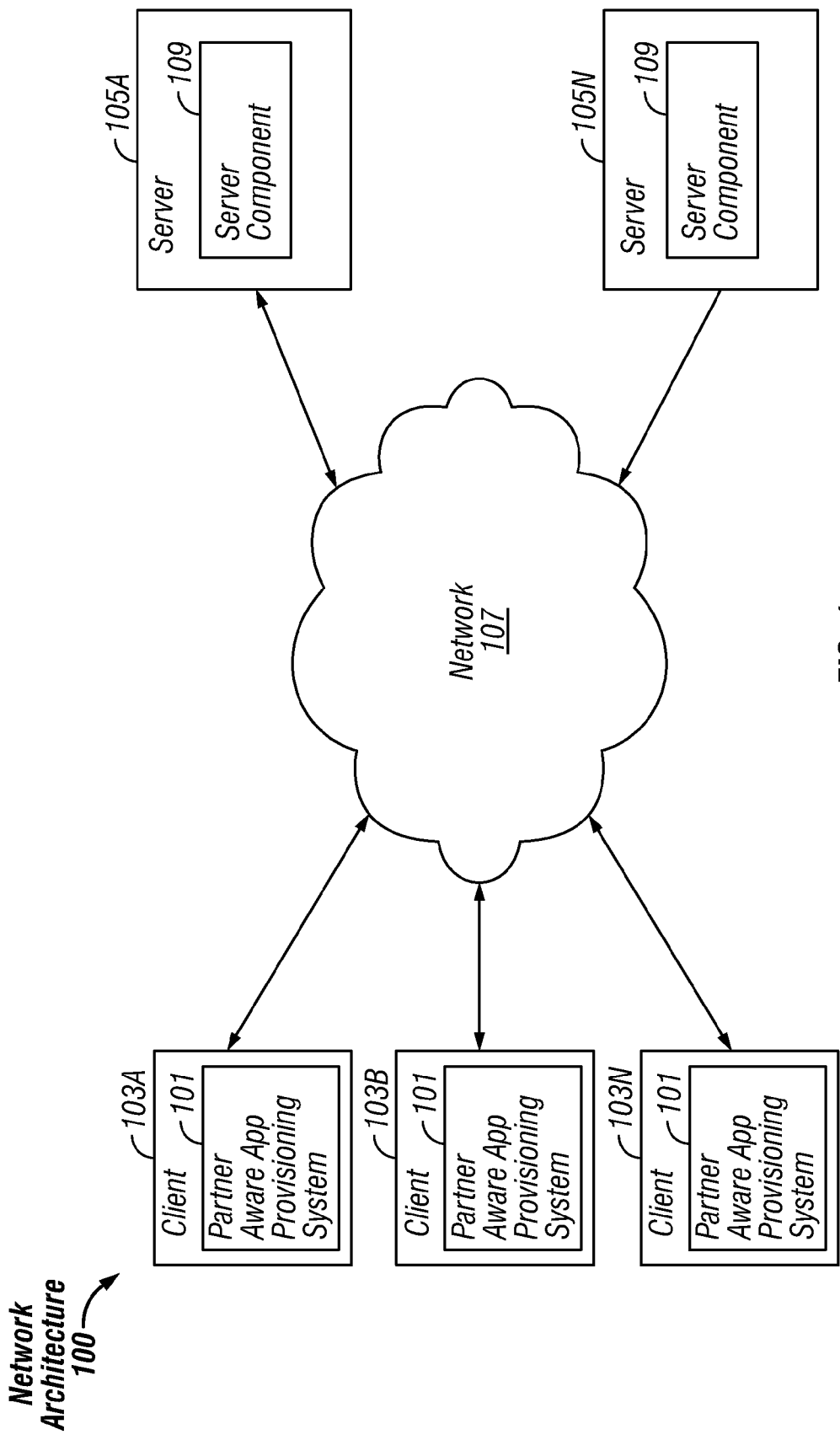
FIG. 1 is a block diagram of an exemplary network architecture in which a partner aware app provisioning system can be implemented, according to some embodiments.

FIG. 1 is a block diagram illustrating an exemplary network architecture 100 in which a partner aware app provisioning system 101 can be implemented. The illustrated network architecture 100 comprises multiple clients 103A, 103B and 103N, as well as multiple servers 105A and 105N. In FIG. 1, a partner aware app provisioning system 101 is illustrated as residing on each client 103A-N, with a server component 109 residing on each server 105-N. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of mobile computing devices 311, comprising portable computer systems 210 capable of connecting to a network 107 and running applications. Such mobile computing devices 311 are sometimes referred to as smartphones, although many mobile phones not so designated also have these capabilities. Tablet computers are another example of mobile computing devices 311.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
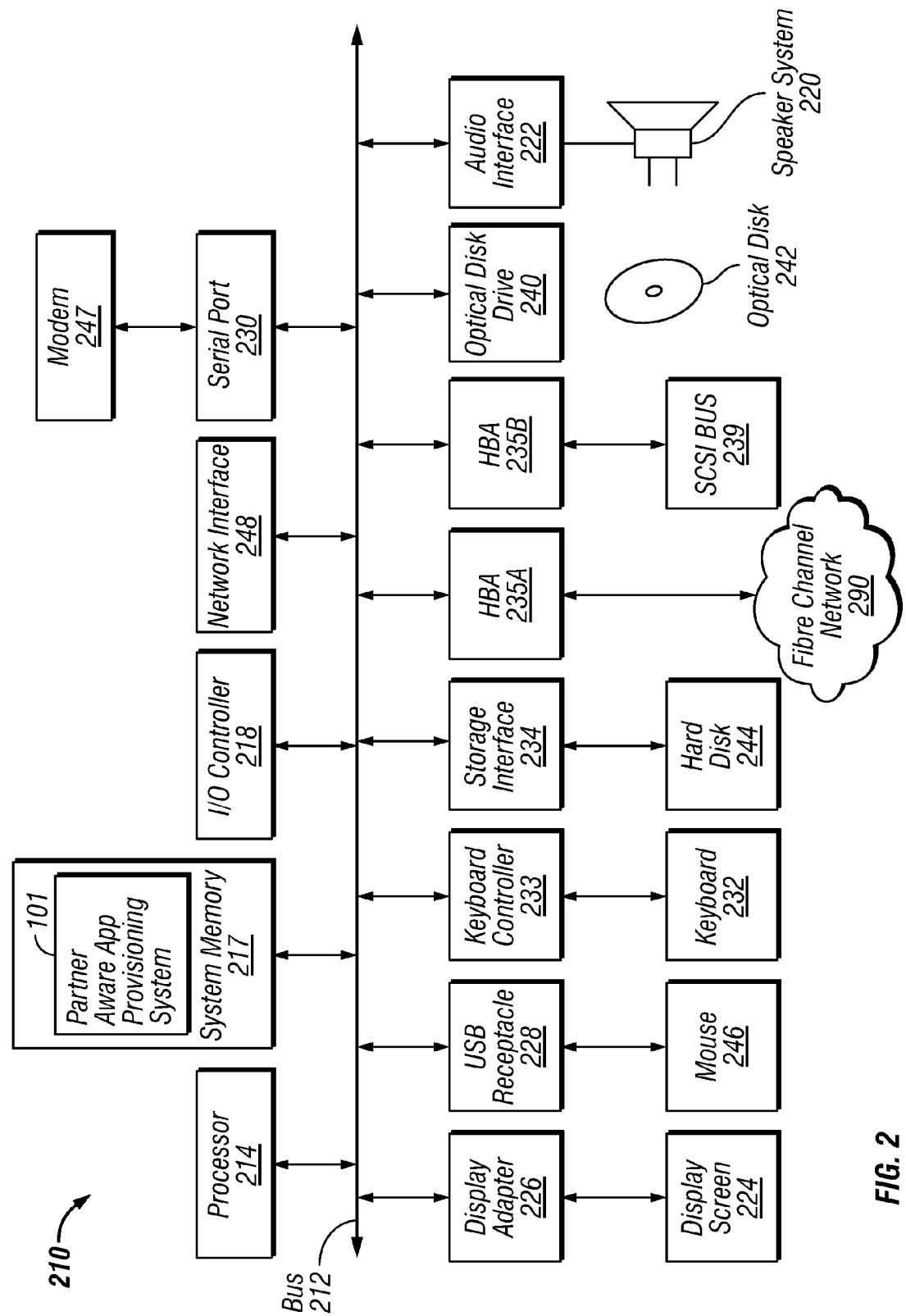
FIG. 2 is a block diagram of a computer system suitable for implementing a partner aware app provisioning system, according to some embodiments.

FIG. 2 is a block diagram of a computer system 210 suitable for implementing a partner aware app provisioning system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices 311 via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the partner aware app provisioning system 101 is illustrated as residing in system memory 217. The workings of the partner aware app provisioning system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
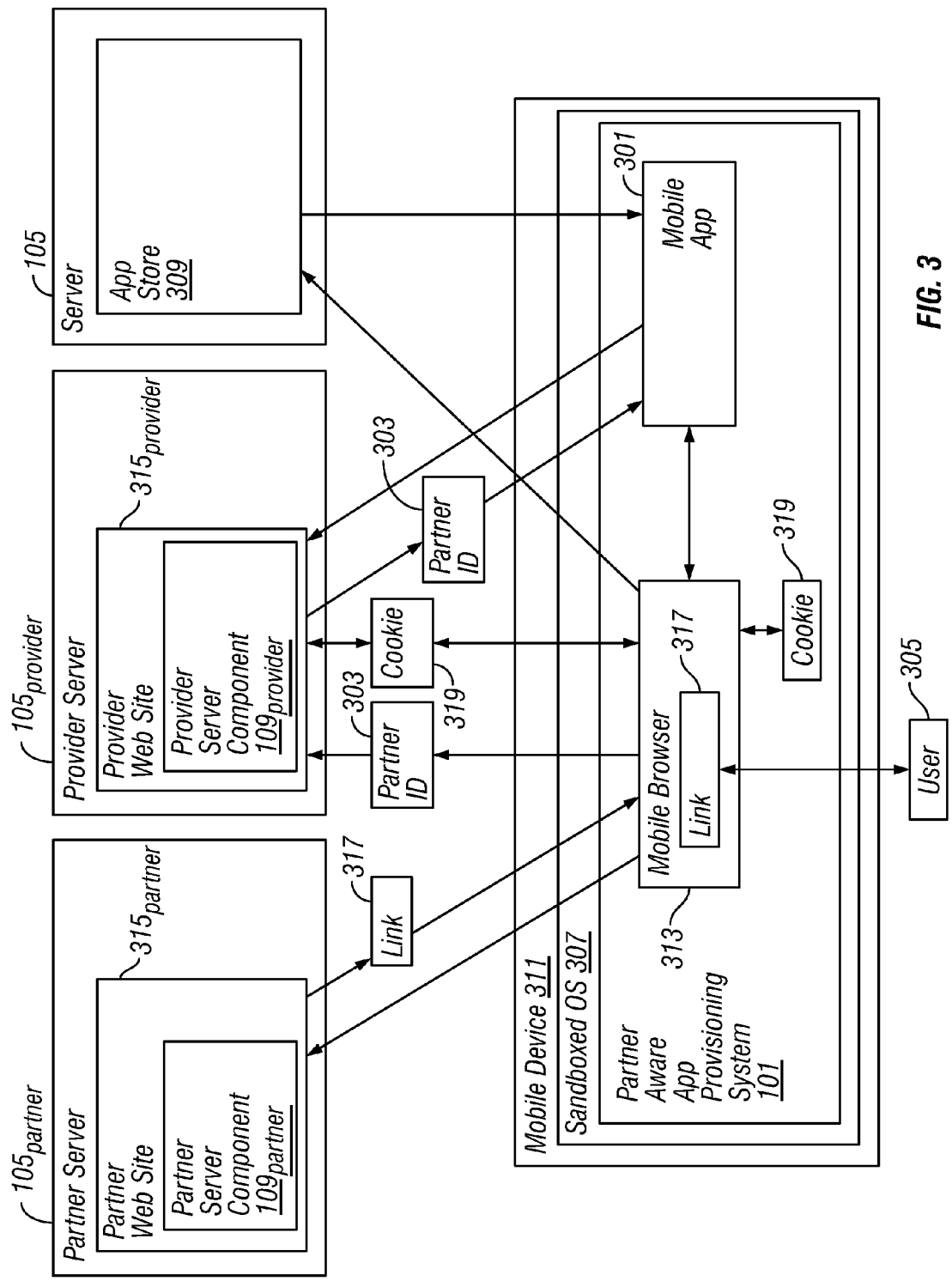
FIG. 3 is a block diagram of the operation of a partner aware app provisioning system, according to some embodiments.

FIG. 3 illustrates the operation of a partner aware app provisioning system 101, according to some embodiments. As described above, the functionalities of the partner aware app provisioning system 101 can reside on a client 103, a server 105, or be distributed between multiple computer systems 210, including within a cloud-based computing environment in which the functionality of the partner aware app provisioning system 101 is provided as a service over a network 107. It is to be understood that although the partner aware app provisioning system 101 is illustrated in FIG. 3 as a single entity, the illustrated partner aware app provisioning system 101 represents a collection of functionalities, which can be instantiated as a single or multiple modules as desired (an instantiation of specific, multiple modules of the partner aware app provisioning system 101 is illustrated in FIG. 3). It is to be understood that the modules of the partner aware app provisioning system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the partner aware app provisioning system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a partner aware app provisioning system 101 runs on a user 305 operated mobile computing device 311 (e.g., a smartphone or tablet) with a sandboxed operating system 307 (e.g., iOS, Windows Phone, etc.). As explained in detail below, the partner aware app provisioning system 101 provisions a generic build of an app 301 with a partner identifier (partner ID) 303, which can be used by the app 301 to provide partner aware branding, authentication and other partner specific features. As user herein a "generic build of an app 301" means an instantiation of the app 301 that is not associated with any specific partner, and thus does not have any partner specific branding or affiliation. As used herein "partner ID 303" means any data specifically denoting a particular partner in a format that can be read by the generic build of the app 301, to determine the identity of the specific partner. The partner ID 303 can be in different formats in different embodiments (e.g., a string comprising the name of the partner, a number uniquely associated with a specific partner, etc.).

FIG. 3 also illustrates three servers 105, one of which hosts a web site $315_{provider}$ of the app provider (e.g., the publisher of the app 301), another of which hosts a web site $315_{partner}$ of the partner for which the app 301 is being provisioned and the third of which hosts an app store 309 corresponding to the specific mobile operating system 307 on the user's mobile computing device 311 (e.g., Apple App Store for iOS, Windows Phone Marketplace for Windows Phone, etc.). The provider web site $315_{provider}$ typically has one or more sections (e.g., pages) specific to the app 301. In other words, a single provider can distribute one or more apps 301, each of which has its own page(s) on the provider web site $315_{provider}$. A provider server component $109_{provider}$ of the partner aware app provisioning system 101 runs on the provider web server $105_{provider}$, and a partner server component $109_{partner}$ runs on the partner web server $105_{partner}$.

For illustrative clarity, although FIG. 3 depicts only a single user operated mobile computing device 311 interacting with a single provider web server $105_{provider}$, a single partner web server $105_{partner}$ and a single app store 309. However, it is to be understood that the functionality of the partner aware app provisioning system 101 can be utilized by many mobile computing devices 311 running different sandboxed operating systems 307 and downloading multiple apps 301 from different corresponding app stores 309. Different apps 301 can be distributed by different providers (each running a separate provider web server $105_{provider}$), and each app 301 may be separately provisioned for different partners (e.g., an ISP and a cellular carrier, etc.), thus brining multiple partner web servers $105_{partner}$ into play.

Referring to FIG. 3, prior to the user's downloading of the app 301 from the app store 309, the mobile browser 313 (e.g., Mobile Safari, Firefox for mobile, Internet Explorer Mobile, Android browser, etc.) on the mobile computing device 311 navigates to the partner web site $315_{partner}$. This can be accomplished by the app provider prompting the user 305 to navigate to the partner web site $315_{partner}$, for example by providing a link in an email or other communication. When the mobile browser 313 navigates to the partner web site $315_{partner}$, the partner server component $109_{partner}$ (instantiated, for example, as web functionality on the partner web site $315_{partner}$) displays a link 317 to the section of the provider web site $315_{provider}$ concerning the app 301, through the mobile browser 313. This link contains the specific partner ID 303 to be used to provision the app 301 for the specific partner. For example, the address underlying the link 317 (e.g., the URL) can contain the partner ID 303 as a parameter (e.g., a URL parameter).

The user 305 then clicks or otherwise selects the link 317, and in response the mobile browser 313 navigates to the section of the provider web site $315_{provider}$ concerning the app 301, and passes the provider web site $315_{provider}$ the partner ID 303. The provider server component $109_{provider}$ (which can be instantiated as web functionality on the provider web site $315_{provider}$) reads the partner ID 303, and writes a cookie 319 containing the partner ID 303 to the mobile computing device 311 through the mobile browser 313. Apps 301 on the sandboxed operating system 307 on the mobile computing device 311 other than the mobile browser 313 cannot subsequently access the cookie 319, because it is outside of their sandboxes. However, the mobile browser 313 itself owns its cookies 319, and thus can read the cookie 319 containing the partner ID 303 as desired.

The provider server component $109_{provider}$ on the provider web site $315_{provider}$ then redirects the user 305 to the app store 309 for the specific mobile operating system 307 on the user's mobile computing device 311 (e.g., Apple App Store for iOS, Google Play for Android, etc.). In order to redirect the user 305 from the provider web site $315_{provider}$ to the app store 309 through the mobile browser 313, the provider server component $109_{provider}$ can use an HTTP 302 redirect (or equivalent or similar functionality). Typically, the redirect takes the user 305 directly to the page on the app store 309 for the specific app 301. That way, after the cookie has been dropped to the mobile device 311, the browser 313 is pointed to the page for the app 301, which is displayed to the user 305. The app 301 is then downloaded from the app store 303 to the user's mobile device 311, via the mobile browser 313 (e.g., the user 305 follows screen prompts/instructions to download the app 301, or in some embodiments some or all of steps of the download are performed automatically). Note that the mobile app 301 available on the app store 309 and downloaded to the mobile device 311 is a generic build of the app 301, that is not associated with any specific partner and does not have any partner branding or affiliation at this point. The downloaded app 301 is installed on the user's mobile device 311 in its generic, non partner aware form.

Once installed, the app 301 runs on the mobile device 311, and registers itself with the operating system 307 as a protocol handler for a protocol specific to the provider (e.g., "provider_mobile_security://" in an example embodiment in which the provider is a publisher of a mobile security app 301). To register itself as a protocol handler, the app 301 uses the protocol handler registration functionality of the specific mobile operating system 307 on the mobile device 311, for example setting up a call back to itself from the provider web site $315_{provider}$. The app 301 then launches the provider web site $315_{provider}$. The provider server component $109_{provider}$ of the partner aware app provisioning system 101 retrieves the partner ID 303 from the cookie 319, and returns a redirect (e.g., a 302 redirect) to the provider specific protocol, with the partner ID 301 in the redirect as a parameter (e.g., "provider_mobile_security://partner_id=PARTNER"). Because the app 301 is registered as the handler for the provider specific protocol, the redirect opens the app 301, which reads the partner ID 303 from the redirect. The app 301 now has the partner ID 303, and subsequently uses it for branding, authentication and/or other partner targeted features as desired.

Recall that the app 301 is running in a sandbox under the sandboxed operating system 307. Therefore, it cannot simply read the partner ID 303 from the cookie 319. However, by using the functionality described above, the partner aware app provisioning system 101 is able to transform the generic build of the app 301 downloaded from the app store 309 into a partner-aware app 301 that includes branding and other targeted features specific to the given partner.

The above-described functionality is very useful for provisioning a generic build of a mobile app 301 with a specific partner ID 303 on a sandboxed operating system 307. It is to be understood that in other embodiments this functionality can be used to provision a generic build of a mobile app 301 on a sandboxed operating system 307 with specific data other than a specific partner ID 303 as desired. Examples of such data include but are not limited to a specific authorization token to be used by the mobile app 301, the location of a specific server 105 to be accessed by the mobile app 301, a specific user account ID to be used by the app 301, etc. As described below in conjunction with FIG. 4, in such embodiments the specific data with which to provision the mobile app 301 can be provided by a web site other 315 than that of the partner (including, for example, a web site 315 operated by the provider). The specific data is then provided to the mobile app 301 according to the same procedure as a specific partner ID 303.

Figure 4:
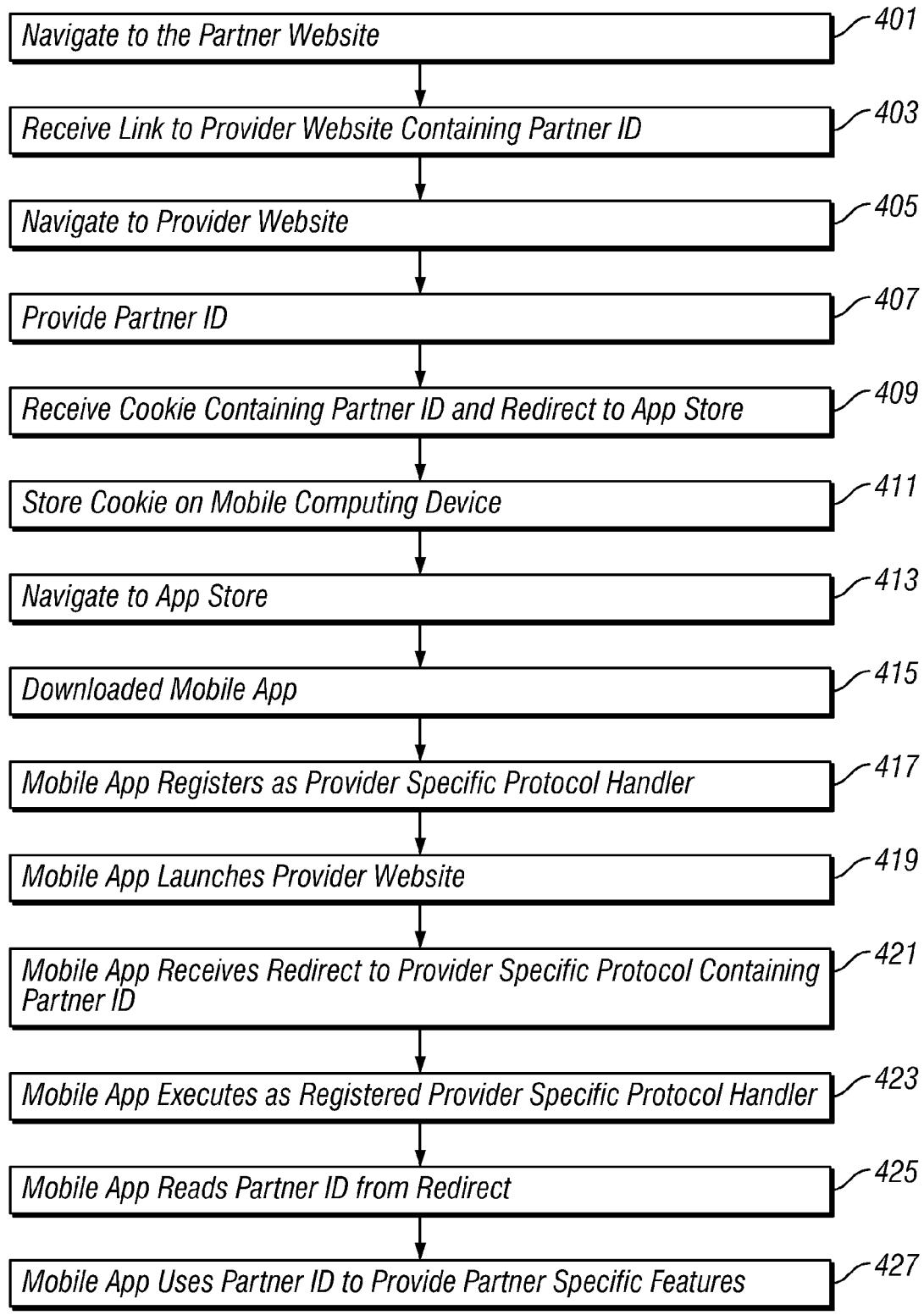
FIG. 4 is a flowchart of the operation of a partner aware app provisioning system, according to some embodiments.

FIG. 4 illustrates steps of the operation of a partner aware app provisioning system 101, according to some embodiments. The mobile browser 313 on the mobile computing device 311 navigates 401 to the website $315_{partner}$ of a specific partner of the provider of the mobile app 301. In other embodiments, the mobile browser 313 navigates 401 to a different website 315, in order to start the process of provisioning specific data other than a partner ID 303, as noted above. For example, the mobile browser 313 can navigate 401 to a website 315 associated with the provision of the specific data. The mobile browser 313 receives 403 a link to a section of a website $315_{provider}$ of the provider concerning the mobile app 301 from the website of the specific partner $315_{partner}$ (or other website 315). The received link contains an identifier 303 of the specific partner (or other specific data with which to provision the mobile app 301). The mobile browser 313 navigates 405 to the section of the website $315_{provider}$ of the provider concerning the mobile app 301, and provides 407 the identifier 303 of the specific partner (or other specific data). The mobile browser 313 receives 409 a cookie 319 containing the identifier 303 of the specific partner (or other specific data) and a redirect to a section of an app store 309 concerning the mobile app 301, from the website $315_{provider}$ of the provider. The mobile browser stores 411 the cookie 319 on the mobile computing device 311, and navigates 413 to the section of the app store 309 concerning the mobile app 301, responsive to the received redirect. A generic build of the mobile app 301 is downloaded 415 from the app store 309 to the mobile computing device 311. The generic build of the mobile app 301 registers 417 itself with the sandboxed mobile operating system 307 as a protocol handler for a provider specific protocol, and launches 419 the website $315_{provider}$ of the provider. A redirect to the provider specific protocol is received 421 from the website $315_{provider}$ of the provider. (The redirect contains the identifier 303 of the specific partner (or other specific data) as a parameter, as retrieved from the cookie 309 on the mobile device 311 by the provider website $315_{provider}$.) The generic build of the mobile app 301 executes 423 on the mobile computing device 311 as the registered protocol handler for the provider specific protocol, responsive to the redirect. The mobile app 301 reads 425 the identifier 303 of the specific partner (or other specific data) from the redirect. The mobile app 301 then uses 427 the identifier 303 to provide features specific to the partner on the sandboxed mobile operating system 307 on the mobile computing device 311. In other embodiments, the mobile app 301 uses the other specific data to perform specific corresponding functionality. For example, in an embodiment where the other data is in the form of a specific authentication token, the app uses the provided token for specific authentication purposes.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for transforming a generic build of a mobile app made available by a provider into a partner aware mobile app associated with a specific partner of the provider, on a sandboxed mobile operating system on a mobile computing device, the method comprising the steps of:

navigating to a website of the specific partner, by a mobile browser on the mobile computing device;

receiving, from the website of the specific partner by the mobile browser, a link to a section of a website of the provider concerning the mobile app, the received link further comprising an identifier of the specific partner;

navigating to the section of the website of the provider concerning the mobile app, by the mobile browser;

providing the identifier of the specific partner to the website of the provider, by the mobile browser;

receiving a cookie containing the identifier of the specific partner and a redirect to a section of an app store concerning the mobile app, from the website of the provider by the mobile browser;

storing the cookie containing the identifier of the specific partner on the mobile computing device, by the mobile browser;

navigating to the section of an app store concerning the mobile app, by the mobile browser, responsive to the received redirect;

downloading the generic build of the mobile app, from the app store to the mobile computing device;

the generic build of the mobile app registering itself with the sandboxed mobile operating system as a protocol handler for a provider specific protocol;

launching the website of the provider, by the generic build of the mobile app;

receiving a redirect to the provider specific protocol, from the website of the provider, wherein the redirect further comprises the identifier of the specific partner as a parameter, the identifier of the specific partner having been retrieved from the cookie on the mobile device by the website of the provider;

the generic build of the mobile app executing on the mobile computing device as the registered protocol handler for the provider specific protocol, responsive to the redirect to the provider specific protocol;

reading the identifier of the specific partner from the redirect to the provider specific protocol, by the mobile app; and using the identifier of the specific partner to provide features specific to the partner, by the mobile app on the sandboxed mobile operating system on the mobile computing device.

2. The method of claim 1 wherein receiving a link further comprising an identifier of the specific partner further comprises:

receiving an underlying address of the link further comprising the identifier of the specific partner as a parameter.

3. The method of claim 1 wherein the received redirects further comprise:

Hyptertext Transfer Protocol ("HTTP") 302 redirects.

4. The method of claim 1 wherein the generic build of the mobile app registering itself with the sandboxed mobile operating system as a protocol handler for a provider specific protocol further comprises:

the generic build of the mobile app setting up a call back to itself from the web site of the provider, by using protocol handler registration functionality of the sandboxed mobile operating system on the mobile device.

5. The method of claim 1 wherein using the identifier of the specific partner to provide features specific to the partner, by the mobile app on the sandboxed mobile operating system on the mobile computing device, further comprises:

using the identifier of the specific partner to provide partner specific branding of the mobile app.

6. The method of claim 1 wherein using the identifier of the specific partner to provide features specific to the partner, by the mobile app on the sandboxed mobile operating system on the mobile computing device, further comprises:

using the identifier of the specific partner to provide partner specific authentication to the mobile app.

7. At least one non-transitory computer readable-storage medium for transforming a generic build of a mobile app made available by a provider into a partner aware mobile app associated with a specific partner of the provider, on a sandboxed mobile operating system on a mobile computing device, the at least one non-transitory computer readable-storage medium storing computer executable instructions that, when loaded into computer memory and executed by at least one processor of a computing device, cause the computing device to perform the following steps:

navigating to a website of the specific partner, by a mobile browser on the mobile computing device;

receiving, from the website of the specific partner by the mobile browser, a link to a section of a website of the provider concerning the mobile app, the received link further comprising an identifier of the specific partner;

navigating to the section of the website of the provider concerning the mobile app, by the mobile browser;

providing the identifier of the specific partner to the website of the provider, by the mobile browser;

receiving a cookie containing the identifier of the specific partner and a redirect to a section of an app store concerning the mobile app, from the website of the provider by the mobile browser;

storing the cookie containing the identifier of the specific partner on the mobile computing device, by the mobile browser;

navigating to the section of an app store concerning the mobile app, by the mobile browser, responsive to the received redirect;

downloading the generic build of the mobile app, from the app store to the mobile computing device;

the generic build of the mobile app registering itself with the sandboxed mobile operating system as a protocol handler for a provider specific protocol;

launching the website of the provider, by the generic build of the mobile app;

receiving a redirect to the provider specific protocol, from the website of the provider, wherein the redirect further comprises the identifier of the specific partner as a parameter, the identifier of the specific partner having been retrieved from the cookie on the mobile device by the website of the provider;

the generic build of the mobile app executing on the mobile computing device as the registered protocol handler for the provider specific protocol, responsive to the redirect to the provider specific protocol;

reading the identifier of the specific partner from the redirect to the provider specific protocol, by the mobile app; and using the identifier of the specific partner to provide features specific to the partner, by the mobile app on the sandboxed mobile operating system on the mobile computing device.

8. The at least one non-transitory computer readable-storage medium of claim 7 further storing computer executable instructions to perform the following additional step:
receiving an underlying address of the link further comprising the identifier of the specific partner as a parameter.

9. The at least one non-transitory computer readable-storage medium of claim 7 wherein the received redirects further comprise:
Hyptertext Transfer Protocol ("HTTP") 302 redirects.

10. The at least one non-transitory computer readable-storage medium of claim 7 further storing computer executable instructions to perform the following additional step:
the generic build of the mobile app setting up a call back to itself from the web site of the provider, by using protocol handler registration functionality of the sandboxed mobile operating system on the mobile device.

11. The at least one non-transitory computer readable-storage medium of claim 7 further storing computer executable instructions to perform the following additional step:
using the identifier of the specific partner to provide partner specific branding of the mobile app.

12. The at least one non-transitory computer readable-storage medium of claim 7 further storing computer executable instructions to perform the following additional step:
using the identifier of the specific partner to provide partner specific authentication to the mobile app.

13. A computer implemented method for providing a generic build of a mobile app made available by a provider with specific variable data, on a sandboxed mobile operating system on a mobile computing device, the method comprising the steps of:
navigating to a website associated with the provision of the specific data, by a mobile browser on the mobile computing device;
receiving, from the website associated with the provision of the specific data by the mobile browser, a link to a section of a website of the provider concerning the mobile app, the received link further comprising the specific data;
navigating to the section of the website of the provider concerning the mobile app, by the mobile browser;
providing the specific data to the website of the provider, by the mobile browser;
receiving a cookie containing the specific data and a redirect to a section of an app store concerning the mobile app, from the website of the provider by the mobile browser;
storing the cookie containing the specific data on the mobile computing device, by the mobile browser;
navigating to the section of an app store concerning the mobile app, by the mobile browser, responsive to the received redirect;
downloading the generic build of the mobile app, from the app store to the mobile computing device;
the generic build of the mobile app registering itself with the sandboxed mobile operating system as a protocol handler for a provider specific protocol;
launching the website of the provider, by the generic build of the mobile app;
receiving a redirect to the provider specific protocol, from the website of the provider, wherein the redirect further comprises the specific data as a parameter, the specific data having been retrieved from the cookie on the mobile device by the website of the provider;
the generic build of the mobile app executing on the mobile computing device as the registered protocol handler for the provider specific protocol, responsive to the redirect to the provider specific protocol;
reading the specific data from the redirect to the provider specific protocol, by the mobile app; and
using the specific data to provide specific corresponding features, by the mobile app on the sandboxed mobile operating system on the mobile computing device.

14. The computer system of claim 13 wherein the partner aware app provisioning system is further programmed to:
receive an underlying address of a link further comprising the specific data as a parameter.

15. The method of claim 13 wherein the received redirects further comprise:
Hyptertext Transfer Protocol ("HTTP") 302 redirects.

16. The method of claim 13 wherein the partner aware app provisioning system is further programmed to:
set up a call back to the mobile app from the web site of the provider, by using protocol handler registration functionality of the sandboxed mobile operating system on the mobile device.

17. The method of claim 13 wherein the specific data further comprises one from a group consisting of:
a specific authorization token to be used by the mobile app, a location of a specific server to be accessed by the mobile app and a specific user account identifier to be used by the app.

* * * * *